United States Patent
Nagase et al.

[11] Patent Number: 5,309,296
[45] Date of Patent: May 3, 1994

[54] SYSTEM FOR ELIMINATING NOISE ARISING FROM DIFFERENCE IN POLARITY OF MAGNETIZATION BY TUNNEL ERASE HEADS

[75] Inventors: Fumio Nagase, Tama; Tohru Miura, Mitaka; Hiroshi Tsuyuguchi, Tokyo, all of Japan

[73] Assignee: TEAC Corporation, Tokyo, Japan

[21] Appl. No.: 801,755

[22] Filed: Dec. 3, 1991

[30] Foreign Application Priority Data

Dec. 7, 1990 [JP] Japan ................. 2-414167

[51] Int. Cl.⁵ .................. G11B 5/03; G11B 5/127; G11B 5/325
[52] U.S. Cl. ...................... 360/66; 360/118
[58] Field of Search ................ 360/66, 57, 118

[56] References Cited
U.S. PATENT DOCUMENTS

| | | | |
|---|---|---|---|
| 4,157,574 | 6/1979 | Stamer | 360/66 |
| 4,164,781 | 8/1979 | Brown | 360/66 |
| 4,466,025 | 8/1984 | Soejima | 360/57 |
| 4,853,799 | 8/1989 | Aikawa | 360/48 |

Primary Examiner—Aristotelis Psitos
Assistant Examiner—Jennifer Pearson
Attorney, Agent, or Firm—Woodcock Washburn Kurtz Mackiewicz & Norris

[57] ABSTRACT

A magnetic disk drive is disclosed which has a tunnel erase head assembly comprising a read/write head for writing and reading data on a magnetic disk, and a pair of tunnel erase heads for trimming a pair of opposite marginal edges of the record track being formed by the read/write head, with the consequent formation of spaces intervening between the record tracks. The spaces created on the same disk by different disk drives may be of one polarity of magnetization or the other, with the possibility of noise production due to an abrupt change in the polarity of magnetization as the read/write head scans any of the spaces as a result of mistracking. For the reduction of such noise the coil of the tunnel erase heads is connected to an erase current source via a circuit whereby the erase current is made to have a staircase or ramp rise and fall.

4 Claims, 4 Drawing Sheets

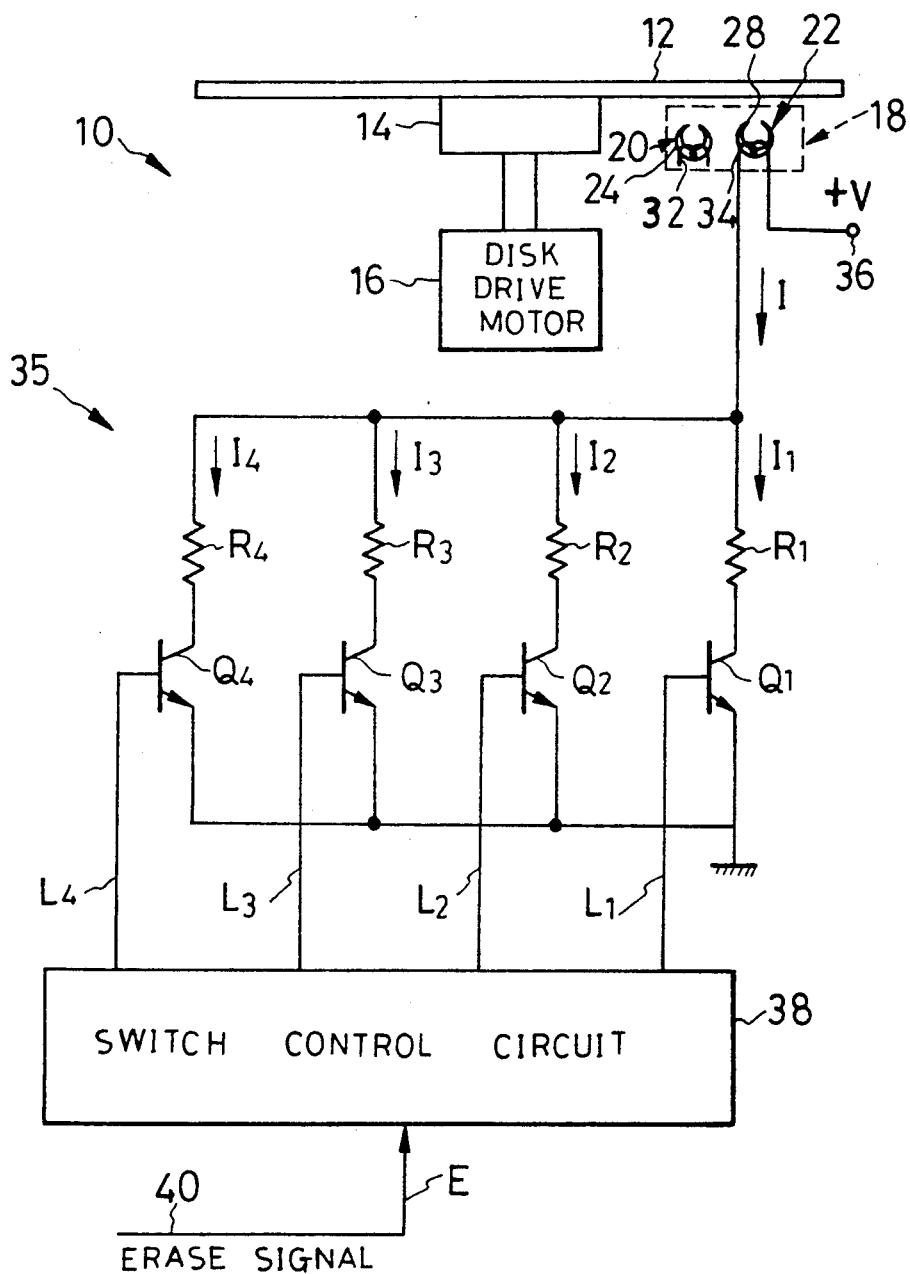

SYSTEM FOR ELIMINATING NOISE ARISING FROM DIFFERENCE IN POLARITY OF MAGNETIZATION BY TUNNEL ERASE HEADS

BACKGROUND OF THE INVENTION

Our invention relates generally to a data storage apparatus for use with magnetic record media such as, typically, those in the form of flexible disks. More particularly, our invention pertains to such a magnetic data storage apparatus, or disk drive according to common parlance, that has an electromagnetic head assembly of the familiar tunnel erase or equivalent type for trimming or erasing the opposite marginal edge portions of each record track as data is written thereon. Still more particularly, our invention concerns a system in such a magnetic data storage apparatus for defeating inconveniences arising from a difference in the polarity of magnetization on the blank spaces created by the erase heads of different disk drives between the record tracks on the flexible magnetic disk or like record media.

The rotating disk data storage apparatus has been known which has a tunnel erase head assembly, as disclosed for example in U.S. Pat. No. 4,853,799 to Aikawa. The tunnel erase head assembly is an integral combination of a read/write head and a pair of tunnel erase heads. As the read/write head creates a record track on the disk, the pair of tunnel erase heads trim off the opposite marginal edge portions of the track. The successive record tracks are therefore created with intervening spaces. These intervening spaces make it possible for the read/write head to subsequently read the data on the tracks in the face of some mistracking.

There has, however, been a problem left unsolved with the tunnel erase head assembly. As indicated in the Aikawa patent, supra, the common tunnel erase coil of erase heads is energized and deenergized under the control of a tunnel erase signal which is derived from the write gate signal. As is well known in the disk drive art, the write gate signal is fed from the host system to enable the read/write head to write on the magnetic disk. If the read/write gap and erase gaps of the tunnel erase head assembly are spaced longitudinally or circumferentially of each annular record track, as is usually the case, then the tunnel erase signal is obtained by delaying the write gate signal a length of time corresponding to the spacing between read/write gap and erase gaps. Thus, as the read/write head starts writing data on any track, the tunnel erase coil is energized with a direct current for trimming the marginal edges of the data track being created.

The problem arises from the fact that the tunnel erase signal, like the write gate signal, is a binary digital signal. Consequently, switched on and off by this digital tunnel erase signal, the tunnel erase coil is energized with a direct erase current that has so far had an instantaneously rise and an instantaneous fall. Such instantaneous rise and fall of the tunnel erase current would present no problem at all if the disk spaces created by the tunnel erase heads were magnetized in the same polarity. The fact is, however, that the polarity of disk magnetization by the tunnel erase heads is not standardized in the disk drive art but differs from one disk drive to another.

The widespread practice now is to put the same magnetic disk to use with two or more different disk drives. This same disk may therefore be tunnel erased in one polarity in one disk drive and in the other polarity in another. In that case the disk spaces between the record tracks will have parts (sectors) that are magnetized in one polarity and other parts that are magnetized in the other. Since the direct current flowing through the tunnel erase coil has hitherto risen and fallen instantaneously as aforesaid, an abrupt change has occurred in the polarity of magnetization from one part to another of any one space.

We object to such an abrupt change in the polarity of magnetization because the read/write head of the tunnel erase head assembly may subsequently scan the spaces as a result of mistracking. The read/write head will then produce a noise output that may interfere with the data to be retrieved. We will later discuss this inconvenience in more detail with reference to the accompanying drawings.

SUMMARY OF THE INVENTION

We have hereby how to reduce, or practically eliminate, the noted interfering noise as a result of an abrupt change from one polarity of magnetization to the other on the spaces between record tracks on a flexible magnetic disk or like record media.

Briefly, our invention may be summarized as an apparatus having read/write head means for writing and reading data on a magnetic record medium by creating record tracks thereon, and erase head means to arranged with respect to the read/write head so to erase a pair of opposite marginal edge portions of each data track being created by the read/write head means, so that spaces are created between the record tracks on the record medium.

More specifically, our invention concerns a system in such an apparatus for the reduction of noise arising from an abrupt change from one polarity of magnetization to another in the spaces between the record tracks on the record medium. The noise reduction system comprises erase current supply means for supplying an erase current to the erase head means, and a transition sloping circuit connected between the erase head means and the erase current supply means for controlling the flow of the erase current through the erase head means. The transistion sloping circuit includes means for sloping at least either, preferably both, of the rise and fall of the erase current that is permitted to flow through the erase head means.

With either or both of the rise and fall of the erase current sloped as above, a change from one polarity of magnetization to the other on the track spaces becomes far less abrupt than when the erase current has an instantaneous rise and an instantaneous fall, as has been the case heretofore. The noise produced by the read/write head means on scanning such track spaces does not interfere with the data being retrieved.

The above and other features and advantages of our invention and the manner of realizing them will become more apparent, and the invention itself will best be understood, from a study of the following description and appended claims, with reference had to the attached drawings.

BRIEF DESCRIPTION OF THE DRAWINGS

FIG. 3 is a schematic electrical diagram of a rotating flexible magnetic disk data storage apparatus incorporating a preferred form of noise reduction system according to our invention;

DETAILED DESCRIPTION

Figure 1:
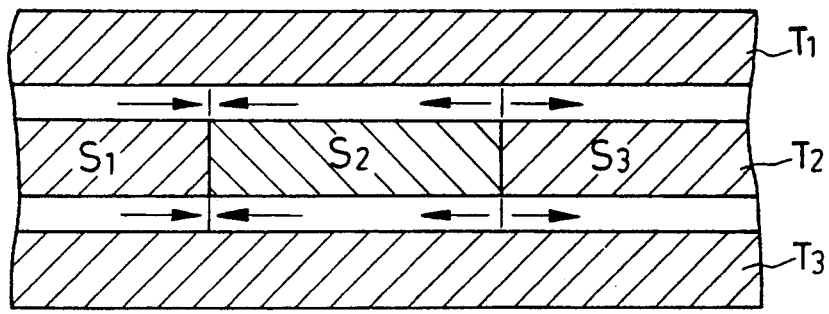
FIG. 1 is a fragmentary illustration of record tracks, with intervening spaces conventionally created by tunnel erasure, on a flexible magnetic disk, the illustration being explanatory in particular of how the track spaces are oppositely magnetically polarized according to the prior art.

We consider it essential that the problem to be solved by our invention be shown and described in some more detail, the better to make clear the features and advantages of our invention. FIG. 1 shows three $T_1$, $T_2$ and $T_3$ of many annular concentric record tracks on a flexible magnetic disk. Take track $T_2$ for instance. It is assumed that data was written on sectors $S_1$ and $S_3$ of track $T_2$ by one disk drive, with the concurrent tunnel erasure of the opposite marginal edge portions of these track sectors $S_1$ and $S_3$. This tunnel erasure created the magnetized spaces of one polarity on both sides of track sectors $S_1$ and $S_3$, as indicated by the arrows shown directed to the right.

Assume further that this magnetic disk was then put to use with another disk drive, in which data was rewritten on sector $S_2$ of track $T_2$. If the tunnel erase coils of this second disk drive were energized with a direct current of opposite polarity to that in the first mentioned disk drive, the spaces on both sides of sector $S_2$ of track $T_2$ would be magnetized in the polarity opposite to that of the spaces on both sides of track sectors $S_1$ and $S_3$, as indicated by the arrows shown directed to the left in FIG. 1.

Figure 2:
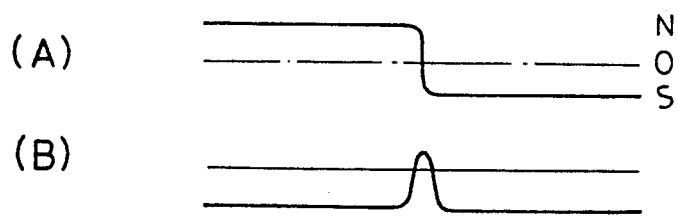
FIG. 2 diagrammatically illustrates at (A) an abrupt change in the polarity of magnetization on the track spaces of FIG. 1, and at (B) the noise waveform produced by a read/write head on scanning such track spaces.

Thus, as schematically represented at (A) in FIG. 2, the spaces on both sides of track $T_2$ would have an abrupt change from one polarity of magnetization to the other at the boundary between sectors $S_1$ and $S_2$ and between sectors $S_2$ and $S_3$. When this magnetic disk is subsequently read in the first, second, or third disk drive, the read/write head might scan these spaces as a result of mistracking. The output waveform from the read/write head would then rise sharply at any of the abrupt transitions from one polarity of magnetization to the other, as depicted at (B) in FIG. 2.

It must be pointed out that such abrupt transitions from one polarity of magnetization to the other present no serious inconvenience as long as the sectors of all the record tracks on the disk are in radial alignment. That is because the tunnel erase current is conventionally switched on and off at the track gaps intervening between the data fields and identification fields. The noise output of FIG. 2(B) can therefore be discriminated from the proper data output.

The trouble is that the track sectors on some disks may not be in exact radial alignment. The gaps on one track may be radially aligned with the data fields or identification fields of the neighboring tracks in such cases. Then the FIG. 2(B) noise will interfere with the data to be retrieved. We have hereby succeeded in virtually eliminating such noise.

We will now describe our invention in detail as embodied in the rotating flexible magnetic disk data storage apparatus illustrated in FIG. 3 and therein generally designated 10. In this figure, however, we have shown the apparatus only insofar as is necessary for a full understanding of our invention. It will nevertheless be seen that the data storage apparatus 10 is shown together with a flexible magnetic disk 12 replaceably held in a preassigned data transfer position on a turntable 14. An electric disk drive motor 16 is coupled directly to the turntable 14 for imparting rotation thereto and thence to the disk 12 thereon.

We assume for the convenience of disclosure that the magnetic disk 12 is single sided, having but one magnetic data storage surface. Thus the apparatus 10 also has one electromagnetic head assembly 18 for data transfer with the single data storage surface of the disk 12. We also understand that the apparatus 10 has a head positioning mechanism, not shown, of any known or suitable construction coupled to the head assembly 18 for track to track accessing.

Figure 4:
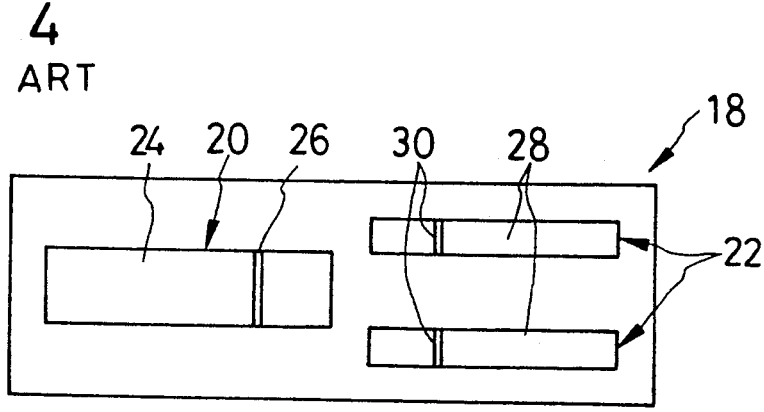
FIG. 4 is a plan view of the magnetic head assembly in the apparatus of FIG. 3.

As illustrated on an enlarged scale in FIG. 4, the head assembly 18 is of the familiar tunnel erase configuration comprising a read/write head 20 and a pair of tunnel erase heads 22. The read/write head 20 has a magnetic core 24 defining a read/write gap 26. Each tunnel erase head 22 also has a magnetic core 28 defining an erase gap 30. The pair of tunnel erase heads 22 are disposed on both sides of the read/write head 20, with a spacing between read/write gap 26 and erase gaps 30 in the longitudinal direction of the record track to be created by the read/write head. Thus the tunnel erase heads 22 function to trim off the opposite marginal edge portions of each record track created by the read/write head 20.

With reference back to FIG. 3 the read/write head 20 further comprises a coil 32 of wire wound on the core 24. The erase heads 22 have a common coil 34 of wire wound on the cores 28. For the ease of illustration, however, we have shown only one tunnel erase head 22 in FIG. 3. The construction of the tunnel erase head assembly 18 as so far described is conventional, and therein lies no feature of our invention. The novel features of our invention will appear hereafter.

The coil 34 of the tunnel erase heads 22 is coupled to a positive direct current supply terminal 36 on one hand and, on the other hand, grounded via a transition sloping circuit 35 constituting a feature of our invention. As the name implies, the transition sloping circuit 35 functions to slope at least either, preferably both, of the rise and fall of the erase current flowing from the supply terminal 36 through the tunnel erase coil 34.

The transition sloping circuit 35 comprises a parallel connection of a plurality of, four in this particular embodiment, resistors $R_1$, $R_2$, $R_3$ and $R_4$ and, in series therewith, as many switching transistors $Q_1$, $Q_2$, $Q_3$ and $Q_4$, and a multiple delay circuit or switch control circuit 38 having output lines $L_1$, $L_2$, $L_3$ and $L_4$ connected to the bases of the switching transistors $Q_1$-$Q_4$, respectively. The switch control circuit 38 has an input line 40 for inputting a binary tunnel erase signal E which has been conventionally derived from the standard write gate signal. The switch control circuit 38 functions to derive switch control signals from the input tunnel erase signal for application to the bases of the switching transistors $Q_1$-$Q_4$.

Operation

Figure 5:
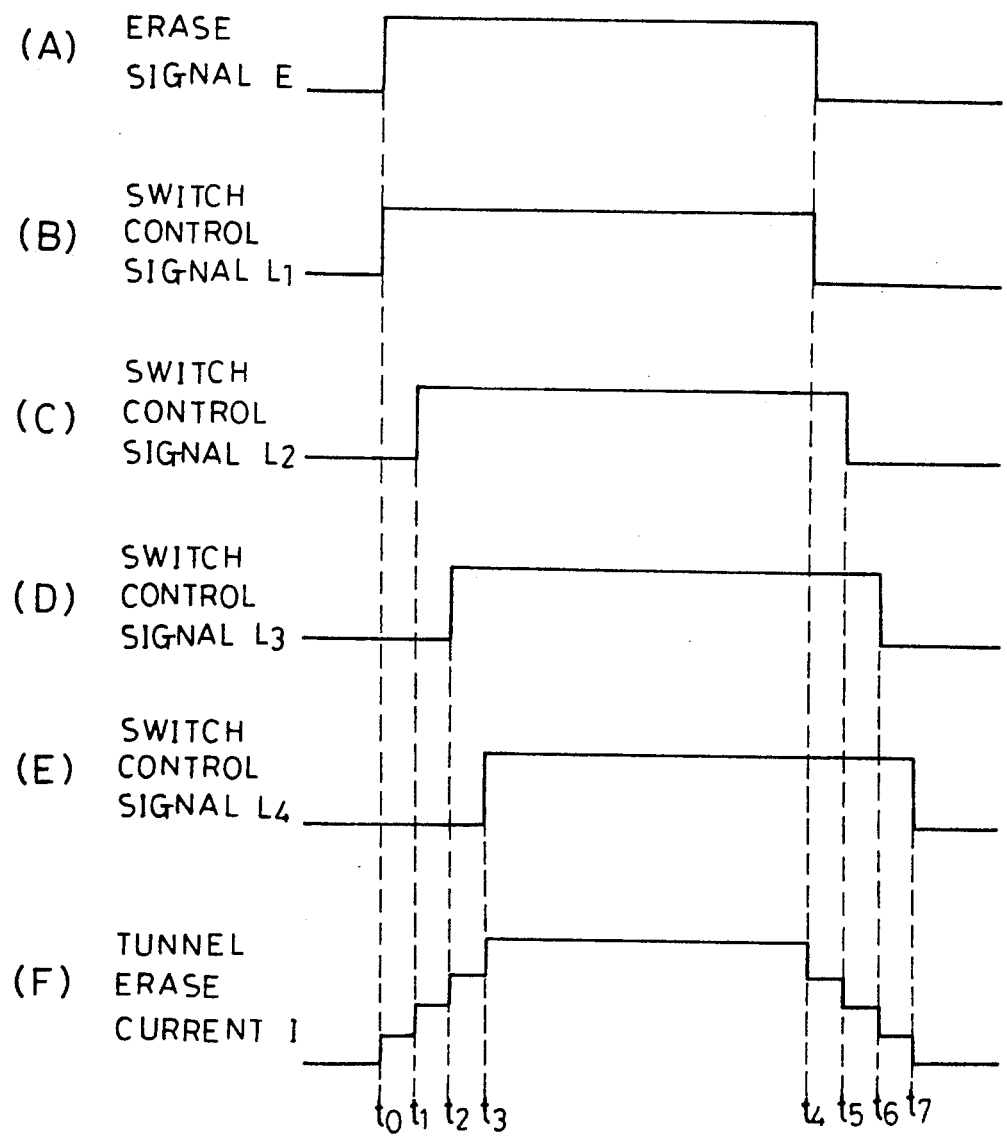
FIG. 5, consisting of (A)-(F), is a series of waveform diagrams useful in explaining the operation the noise reduction system in the FIG. 3 apparatus.

We have indicated at (A) in FIG. 5 the tunnel erase signal E input to the switch control circuit 38, at (B)-(E) the switch control signals impressed from the switch control circuit to the bases of the switching transistors $Q_1$-$Q_4$, and at (F) the resulting current flowing through the coil 34 of the tunnel erase heads 22.

It will be observed from FIG. 5(B) that the first switch control signal, impressed from the switch control circuit 38 to the first switching transistor $Q_1$, is equivalent in phase to the tunnel erase signal E of FIG. 5(A), both signals rising at time $t_0$ and falling at time $t_4$. The switch control circuit 38 delays the input tunnel erase signal E for a preassigned length of time for providing the second switch control signal of FIG. 5(C), which rises at time $t_1$ and falls at time $t_5$, for application to the second switching transistor $Q_2$. Further the switch control circuit delays the input tunnel erase signal E for twice the noted preassigned length of time for providing the third switch control signal of FIG. 5(D), which rises at time $t_2$ and falls at time $t_6$, for application to the third switching transistor $Q_3$. Still further, the switch control circuit delays the input tunnel erase signal E for thrice the noted preassigned length of time for providing the fourth switch control signal of FIG. 5(E), which rises at time $t_3$ and falls at time $t_7$, for application to the fourth switching transistor $Q_4$.

Thus, in response to the switch control signals supplied as above, the first switching transistor $Q_1$ conducts during the $t_0$-$t_4$ time internal, the second switching transistor $Q_2$ during the $t_1$-$t_5$ time internal, the third switching transistor $Q_3$ during the $t_2$-$t_6$ time interval, and the fourth switching transistor $Q_4$ during the $t_3$-$t_7$ time interval.

As will be understood by referring to FIG. 3 again, the tunnel erase current I flows through the coil 34 of the pair of tunnel erase heads 22 when any of the four switching transistors $Q_1$-$Q_4$ is conductive. It will also be seen that the tunnel erase current I is the sum of the currents $I_1$, $I_2$, $I_3$ and $I_4$ flowing through the parallel circuits of the resistors $R_1$-$R_4$ and the transistors $Q_1$-$Q_4$. Therefore, as indicated at (F) in FIG. 5, the tunnel erase current I rises with a series of steps and falls with a series of steps in this particular embodiment.

Although characteristic of this particular embodiment, such staircase rise and fall of the tunnel erase current are nevertheless no essential features of our invention as taken in its broader aspect. All that is required by our invention, instead, is that at least either of the rise and fall of the tunnel erase current be gradual, instead of instantaneous as with the prior art.

Figure 6:
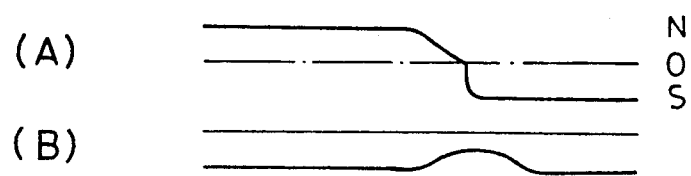
FIG. 6, which is similar to FIG. 2, diagrammatically illustrates at (A) a gradual change in the polarity of magnetization on the track spaces created according to our invention, and a (B) the resulting waveform of reduced noise level.

At (A) in FIG. 6 we have schematically represented the manner of transition from one polarity of magnetization to the other that will occur in any of the spaces between the record tracks on the disk 12. The north seeking magnetization has been created by the FIG. 3 disk drive 10 in which the common tunnel erase coil 34 has been energized with the erase current I having the staircase rise and fall of FIG. 5(F). The south seeking magnetization has been created by a conventional disk drive in which the tunnel erase coil have been energized with an erase current that is opposite in polarity to the FIG. 5(F) erase current I and that has an instantaneous rise and fall.

On subsequently scanning such a space the read/write head 20 will produce the waveform depicted at (B) in FIG. 6. As will be understood upon comparison with FIG. 2(B), the FIG. 6(B) waveform is far smoother than when the polarity of magnetization changes abruptly as in FIG. 2(A). We have ascertained by experiment that the FIG. 6(B) waveform represents no noise that might interfere with the desired data being retrieved.

The circuitry of FIG. 3 offers the advantage that the transistors $Q_1$-$Q_4$ need not be of any high antisurge capability. This is because the current flowing through the tunnel erase coil 34 has no abrupt change in magnitude, with the consequent decrease in voltage surge at the time of the turnoff of the transistors.

Second Form

Figure 7:
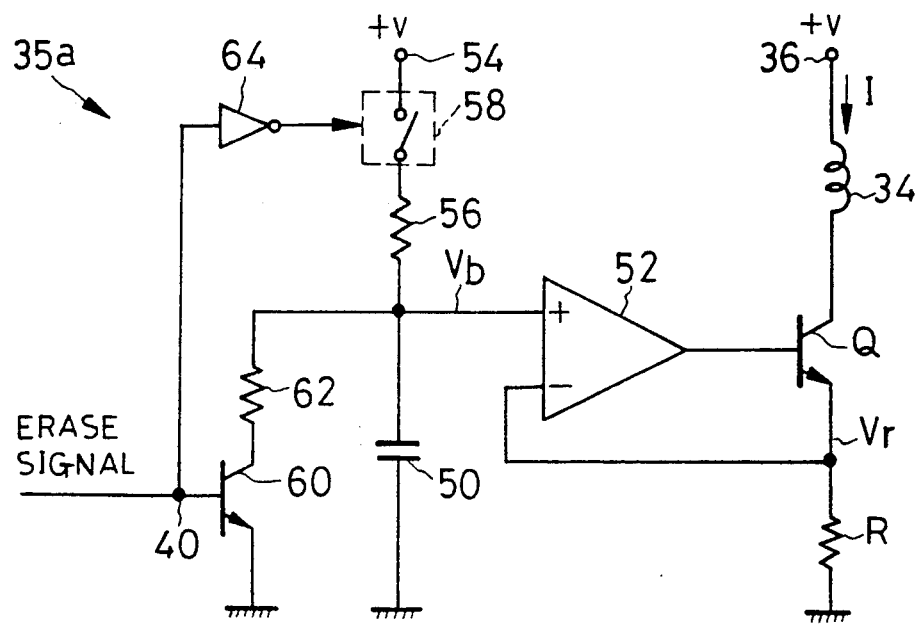
FIG. 7 is a schematic electrical diagram of another preferred form of noise reduction system according to our invention.

FIG. 7 shows a modified transition sloping circuit 35a which may be incorporated in the FIG. 1 apparatus 10 in place of the first disclosed transition sloping circuit 35. The modified transition sloping circuit 35a is designed to impart a ramp rise and a ramp fall to the tunnel erase current, instead of the staircase rise and fall of the preceding embodiment.

The tunnel erase coil 34 of tunnel erase cores is connected between the positive direct current supply terminal 36 and the ground via a serial circuit of but one transistor Q and one resistor R. The tunnel erase signal E on the line 40 is herein used to control the charging and discharging of a capacitor 50, instead of making direct switching control of the transistor Q. This transistor functions to control the magnitude of the tunnel erase current I, rather than to make its on/off control, so that the transistor Q may be called the current control transistor rather than the switching transistor.

Connected to the base of the current control transistor Q is an operational amplifier 52 which has its negative input connected to the emitter of the transistor Q. The capacitor 50 is grounded on one hand and, on the other hand, connected to a second positive supply terminal 54 via a serial circuit of a charging resistor 56 and a charge control switch 58, besides being connected to the positive input of the operational amplifier 52. Further, as a discharge control switch, a transistor 60 is connected in parallel with the capacitor 50 via a resistor 62. The tunnel erase signal line 40 is connected both to the base of the discharge control transistor 60 and, via an inverter 64, to a control input of the charge control switch 58. The inverter 64 serves to make the charge control switch 58 on when the discharge control transistor 60 is off, and vice versa.

Operation of Second Form

Figure 8:
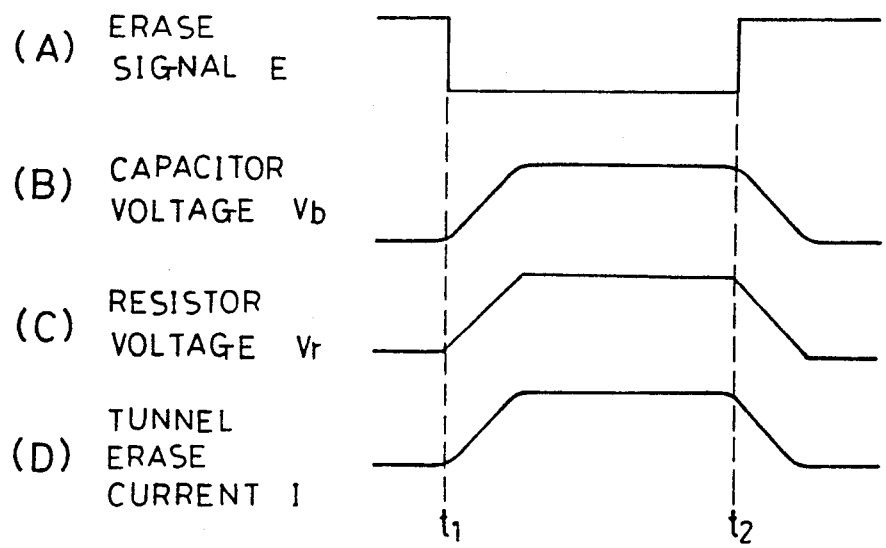
FIG. 8, consisting of (A)-(D), is a series of waveform diagrams useful in explaining the operation of the noise reduction system of FIG. 7.

At (A) in FIG. 8 we have shown the tunnel erase signal E of the FIG. 7 embodiment to be opposite in polarity to that shown in FIG. 5(A), going low for dictating the energization of the tunnel erase coil 34. However, as will become apparent as the description proceeds, the tunnel erase signal of this alternate embodiment could be of the same polarity as that of the FIG. 3 embodiment, only if the inverter 64 were connected between tunnel erase signal line 40 and discharge control transistor 60.

When the tunnel erase signal E goes low at time $t_1$, the discharge control transistor 60 will become nonconductive whereas the charge control switch 58 will be closed as the tunnel erase signal E is inverted by the inverter 64. The capacitor 50 will then be charged from the second supply terminal 54 via the resistor 56.

Thus, as indicated at (B) in FIG. 8, the voltage Vb on the capacitor 50 will start rising linearly at the time $t_1$. The output from the operational amplifier 52 will vary in magnitude in proportion with the difference between the input voltage Vb and a voltage Vr, shown at (C) in FIG. 8, across the resistor R. The operational amplifier 52 will function to increase the magnitude of the current flowing through the current control transistor Q when the capacitor voltage Vb is greater than the resistor voltage Vr, and to decrease the current magnitude when the capacitor voltage Vb is less than the resistor voltage Vr, thereby controlling the base current of the transistor Q so that the voltages Vb and Vr may equal each other.

Since the collector current and emitter current of the transistor are approximately equal, the current I flowing through the pair of tunnel erase coil 34 from the first supply terminal 36 is defined as Vr/R and, therefore, Vb/R. Thus the tunnel erase current I varies in proportion with the capacitor voltage Vb, as at (D) in FIG. 8.

As the capacitor voltage Vb saturates and levels off shortly after the time $t_1$, so will the tunnel erase current I. Then, as the tunnel erase signal E goes high at time $t_2$, as at (A) in FIG. 8, the discharge control transistor 60 will become conductive whereas the charge control switch 58 will open as the tunnel erase signal is inverted by the inverter 64. The capacitor 50 will then discharge via the serial circuit of resistor 62 and discharge control transistor 60. The capacitor voltage Vb will then decrease linearly, with a proportional decrease in the tunnel erase current I.

Possible Modifications

Although we have shown and described our invention in terms of but two preferable embodiments thereof, we recognize, of course, that our invention could be embodied in other forms within the broad teaching hereof. The following, then, is a brief list of possible modifications or alterations of the illustrated embodiments which we believe all fall within the scope of our invention:

1. Only either, instead of both, of the rise and fall of the tunnel erase current could be sloped, for even then the number of read errors taking place as a result of an abrupt change from one polarity of magnetization to the other would become half that in the case where the tunnel erase current had both an instantaneous rise and an instantaneous fall.

2. The number of the switching transistors $Q_1-Q_4$ and resistors $R_1-R_4$ in the FIG. 3 transition sloping circuit 35 could be more or less than four for providing a greater or smaller number of steps for the rise and fall of the tunnel erase current.

3. Also in the FIG. 3 transition sloping circuit 35 the resistors $R_1-R_4$ could be of different resistance values.

4. A variety of other circuit means could be employed for controlling the charging and discharging of the capacitor 50 in the FIG. 7 transition sloping circuit 35a.

What we claim is:

1. An apparatus having read/write head means for writing and reading data on a magnetic record medium by creating record tracks thereon, and erase head means so arranged with respect to the read/write head so to erase a pair of opposite marginal edge portions of each data track being created by the read/write head means, with the consequent creation of spaces intervening between the record tracks on the record medium, wherein the improvement resides in a system for the reduction of noise arising from an abrupt change from one polarity of magnetization to another in the spaces between the record tracks, the noise reduction system comprising:
   (a) erase current supply means for supplying an erase current to the erase head means; and
   (b) a transition sloping circuit connected between the erase head means and the erase current supply means for controlling the flow of the erase current through the erase head means, the transition sloping circuit having means for sloping at least either of a rise and fall of the erase current flowing through the erase head means.

2. The invention of claim 1 wherein the apparatus has erase signal supply means for supplying a binary erase signal, and wherein the transition sloping circuit comprises:
   (a) a parallel connection of a plurality of switching elements;
   (b) a plurality of resistors each connected in series with one of the switching elements; and
   (c) a switch control circuit connected between the erase signal supply means and the switching elements for causing conduction through the switching elements with a series of delays in response to the binary erase signal.

3. The invention of claim 1 wherein the apparatus has erase signal supply means for supplying a binary erase signal dictating the energization and deenergization of the erase head means, and wherein the transition sloping circuit comprises:
   (a) a current control element connected in series with the erase head means;
   (b) a capacitor;
   (c) first circuit means connected between the erase signal supply means and the capacitor for charging the capacitor when the erase signal dictates the energization of the erase head means with the erase current, and for discharging the capacitor when the erase signal dictates the deenergization of the erase head means; and
   (d) second circuit means connected between the capacitor and the current control element for causing the flow of the erase current through the erase head means in proportion with the voltage of the capacitor.

4. The invention of claim 3 wherein the second circuit means comprises an operational amplifier.

* * * * *